J. A. KENNEDY.
METHOD OF AND MACHINE FOR PRODUCING INTERNALLY COATED OR LINED WOVEN TUBES.
APPLICATION FILED APR. 1, 1916.
1,327,677. Patented Jan. 13, 1920.
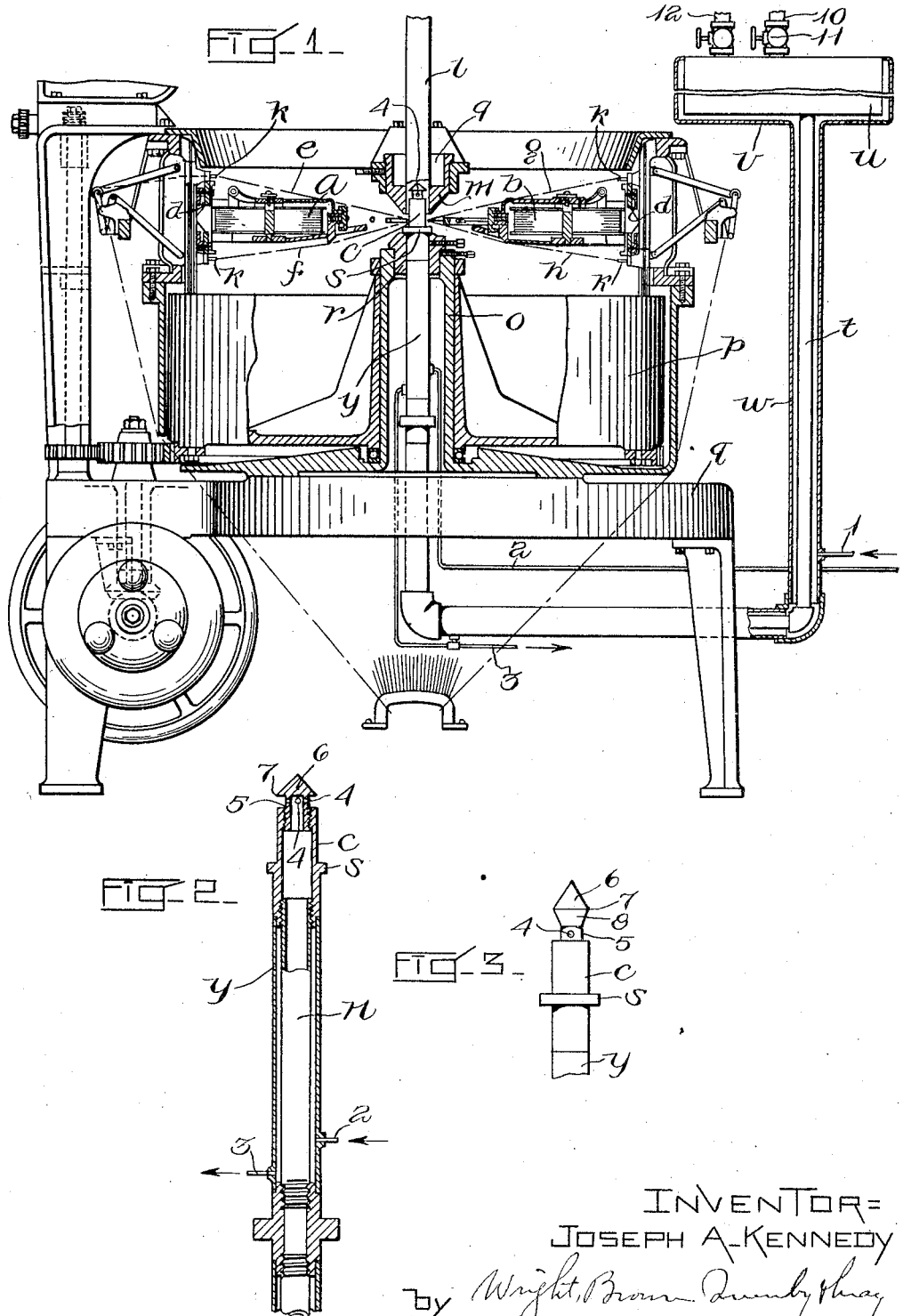
INVENTOR=
JOSEPH A. KENNEDY
by Wright, Brown, Quinby & Way
ATTORNEYS

UNITED STATES PATENT OFFICE.

JOSEPH A. KENNEDY, OF PAWTUCKET, RHODE ISLAND, ASSIGNOR TO CHERNACK MANUFACTURING COMPANY, OF PAWTUCKET, RHODE ISLAND, A CORPORATION OF RHODE ISLAND.

METHOD OF AND MACHINE FOR PRODUCING INTERNALLY COATED OR LINED WOVEN TUBES.

1,327,677. Specification of Letters Patent. Patented Jan. 13, 1920.

Application filed April 1, 1916. Serial No. 88,241.

*To all whom it may concern:*

Be it known that I, JOSEPH A. KENNEDY, a citizen of the United States, residing at Pawtucket, in the county of Providence and State of Rhode Island, have invented new and useful Improvements in Methods of and Machines for Producing Internally Coated or Lined Woven Tubes, of which the following is a specification.

The present invention has for its object to produce woven tubes having an internal coating or lining. Such lining may be waterproof or fireproof, or both, and it may have various degrees of stiffness. In other words, the character of the lining is not material to the present invention and it may have any characteristics consistent with the qualities necessary for enabling it to be applied. As better explaining the character or utility of the invention, I may note that lined or internally coated woven tubing is in wide use for many purposes, such as that of garden hose, gas tubing, etc. Such hose and tubing are usually lined with rubber compositions, are expensive to produce, subject to rapid deterioration, and are not fireproof. It is part of my object to provide hose and tubing for the purposes above indicated, among others, which may be fireproof, if desired, more durable than rubber lined hose, and can be produced at a lower cost and sold at a lower price than the lined woven hose or reinforced rubber hose heretofore produced.

For accomplishing my object I have designed an attachment to a circular loom by which a plastic composition may be forced into contact with the inner surfaces of a tube being woven upon the loom, such composition being of a character such as to become firm after drying or cooling. The invention thus involves the combination with a circular loom of an injecting device for the purpose indicated and it also consists in the process of coating the interior of a tube under construction by injecting thereinto such a composition as is above indicated. Furthermore the invention includes a means for, and the step of, preventing an excess of the composition being injected into the tube to the end that only enough may be thus injected to form a lining efficient for the purposes for which it is provided.

In the drawings wherein I have illustrated an operative form of means embodying one part of the invention, and constituting a form of apparatus for carrying out the method which constitutes the other part of the invention, Figure 1 shows a vertical central section of a circular loom and conduit with a nozzle arranged for injecting the lining composition into the interior of the tube being woven on the loom.

Fig. 2 is a central longitudinal section of the nozzle and the adjacent end of the conduit shown in Fig. 1.

Fig. 3 is an elevation of a modified form of nozzle.

The same reference characters indicate the same parts in all the figures.

Although the invention comprises as an element thereof a circular loom, yet this part of the combination is not restricted to any particular type of loom. I have chosen for illustration of this element a circular loom of the type shown in the patent to Abraham E. Chernack No. 1,088,061, granted February 24, 1914 as modified by the improvements illustrated in the application for patent of the United States filed by me February 2, 1916 Ser. No. 75,865. So much of the loom as is material for an understanding of the present invention is shown in Fig. 1. Referring to this figure *a* and *b* represent shuttles which travel in a circular path about a mandrel or core *c*, being guided by a track *d* and propelled in any desired way, conveniently in the manner described in the aforesaid patent and application, but in any other way if desired. The shuttles thus traveling lay the filling threads in the shed formed between warp threads, certain of which are indicated by the broken lines *e, f, g,* and *h*. Such warp threads pass through eyes *k* on heddles or slides which are reciprocated by means such as shown in said patent and application or otherwise to change the shed and thus cause the warp threads to pass successively over and under the successive turns of the filling or shuttle threads. The fabric thus formed by interweaving of the warp and shuttle threads about the mandrel *c* forms a tube *l* which is withdrawn through a guide *m* as fast as its construction progresses, whereby the weaving constantly takes place at the same point or level, and the tube under construction is led away with a speed equal to the rate at which its length is added to by the addition of successive turns of the filling threads.

The mandrel or core $c$ besides serving as the form about which the filling threads are wound in the weaving of the tubular web, also serves the further purpose of a conduit for conducting fluid or semifluid plastic material into the interior of the newly constructed tube for the purpose of providing a coating or lining therefor. A pipe $n$ is connected to the mandrel, which is hollow, as shown in Fig. 2, said pipe passing through a tubular post or column $o$ which supports the cylindrical cam $p$ which operates the warp-guiding heddles. This post is supported on a base frame $q$ and is open from end to end. In its upper end is seated a bushing or holder $r$ for the mandrel, said mandrel passing into the holder and having a collar $s$ resting on the upper end thereof. The pipe $n$ for feeding the plastic lining composition to the mandrel is connected by suitable couplings and connections, which may be of any ordinary or other desired type, with a pipe line $t$ leading from a tank or reservoir $u$ wherein is contained a supply of the lining composition. Such composition may be of a character such that it is fluid only when hot, being firm at the ordinary atmospheric temperatures, wherefore means may be provided for maintaining it at the temperature of fluidity in the tank and in its course from the tank to the mandrel. The means here shown comprises a jacket or shell $v$ inclosing the tank, a housing $w$ inclosing a pipe line $t$, and a jacket $y$ surrounding the pipe $n$. These jackets and housing may be supplied with live steam, or other heating agent, at any desired temperature, for the purpose of supplying which I have shown pipes 1 and 2, together with a pipe 3 for conducting away the exhausted heating agent, or the water of condensation thereof when such agent is live steam. Any other heating means suitable for the purpose may be used, however, instead of a heated fluid.

The mandrel $c$, to which the lining composition is supplied as above described, is thus adapted to serve as a nozzle to inject the composition into the interior of the pipe. To serve this purpose it is provided with discharge orifices 4 formed in a reduced neck portion 5 near the outer end of the mandrel. A head 6 on the extreme end of the mandrel is provided with a lip or flange 7 of greater diameter than the narrow neck 5. Thereby a groove is formed in the outer side of the mandrel or nozzle which is fed with the lining composition through the orifices 4, and in which is maintained a body of the lining composition sufficient in quantity to coat or impregnate the interior of the tube. The lip 7 is a gage limiting the thickness of the layer of the lining material finally allowed to remain in the tube. According as this lip fits closely within the tube, or is separated from it by an annular space of greater or less width, is the lining of less or greater thickness. Mandrel nozzles having lips of greater or less diameter may be substituted for one another according to the character of work desired to be produced; and it is also within my contemplation to provide detachable or interchangeable heads or gage lips capable of being applied to the same mandrel nozzle in a location essentially as shown in the drawing. As here shown the head 6 and neck 5 are made as a single piece externally threaded to be screwed into the open end of the tubular mandrel $c$.

Fig. 3 shows a modification of the structure last described in which head $6^a$ serves as a presser or packer to compress the lining material against the walls of the tube. To this end a flaring surface 8 is provided joining the neck 5 with the lip 7, the action of which is obviously to apply a pressure outwardly against the lining composition, forcing it into the interstices of the fabric, making it more compact, and expelling bubbles, if any are present in the composition. Many compositions suitable for the character of linings indicated are comparatively viscous and flow with difficulty, whereby it is possible to condense and compact them by means as described above. The condensing effect may be made more positive in the case of those compositions which harden upon cooling, by providing a cooling agent to chill the tube close to the nozzle, so that by the time the lining composition has passed the head of the nozzle it has nearly or completely lost all fluidity. It may be noted that there is a recess 9 in the upper side of the guide $m$ adapted to contain a cooling agent or to receive a coil surrounding the tube in which a refrigerant may be caused to flow.

The condensing or compacting effect upon the lining may be accomplished also by applying pressure to the fluid in the conduit, either in connection with the expanding packing head, or with means for cooling the lining in the tube, or independently. As shown, the tank $u$ is located above the discharge point of the mandrel nozzle, whereby a gravity flow of the lining material to the orifice of the nozzle tends to take place. In addition I have provided means by which an additional pressure may be applied to the fluid in the tank, the means here illustrated comprising a pipe 10 having a valve 11, through which steam, compressed air, water under pressure, or other means may be admitted to the tank so as to press on the surface of the fluid composition contained therein. In this case, of course, the tank is provided with a sufficiently strong and tight cover. The pipe 12 represents a means for replenishing the supply of the composition in the tank. Instead of applying force to the fluid in the tank by means of pneumatic or hydraulic pressure, I contemplate providing a loaded piston or plunger for the same purpose.

The effect of the several forms of means described for applying pressure to the fluid in the tank $u$ is evidently the same, namely, to exert pressure upon the fluid in contact with the walls of the tube at the discharge point of the nozzle, thereby conforming the lining material exactly with the local irregularities of the surface of the tube, and making the lining relatively dense and homogeneous.

It is evident that the process of lining the tube as above described is carried on simultaneously with the process of manufacturing the tube, and exactly as fast as the tube is built, whereby the joint effect of the two parts of the combination is to furnish a lined or coated tube in the same length of time required under any circumstances for the constructure of an unlined tube. In this feature alone is contained a great advantage over previous methods, because I am able to produce the lined tube without using a previously constructed lining, and the tube requires no further operation after being woven. The one machine, being supplied with the threads to form the elements of the tube, and with the plastic lining composition, is thus able in a single operation to build up the tube from its elements and line it.

Substances and compounds suitable for waterproof and fireproof linings for hose and tubing are at the present time commercially available, and I may use for my purpose any of such substances as are adapted to serve the purpose. I do not herein make claim to any particular substance for the purpose, nor do I limit my claim to the use of any particular substance. What I claim in this application is a machine and a method for constructing and lining a tube in the one operation, and in making this claim I do not limit my invention to any particular materials for either the lining or the elements of the tube, or to any particular combination of elements for interweaving the elements of the tube.

The product of the invention hereinbefore described is capable of being used as a conduit for liquids or gases and is more durable than rubber lined or coated tubes, and may be produced and sold at much less cost.

What I claim and desire to secure by Letters Patent is:

1. An apparatus for producing internally coated or lined tubes, comprising a collection of instrumentalities adapted and operable to interweave the elements of a tube, and means for conducting a plastic composition into the newly formed tube, said means being constructed to spread such composition against the inner surface, and excluding it from the outer surface, of the tube.

2. The combination with means for forming and changing a circular shed of warp threads and means for laying a helical filling thread in such shed, and an annular guide adjacent to which such warp and filling threads are interwoven and through which the woven fabric is led away, of means passing across the plane in which the filling thread is led and into the open end of the web of fabric, constructed to discharge a fluid composition against the inner surface of such fabric.

3. The combination with a circular loom, having means for weaving a tubular fabric, of a nozzle crossing the weaving plane of the loom within said tubular fabric and having a discharge orifice on the same side of such weaving plane as that from which the fabric product of the loom is led away, and means for conducting a plastic composition into the interior of said nozzle.

4. A circular loom including in its construction, a mandrel and instrumentalities for weaving a tubular fabric around said mandrel, the mandrel being hollow and constructed in part as a nozzle with a discharge orifice located at the same side of the weaving point of the loom as that from which the fabric product of the loom is led away, and means for conducting plastic coating composition into the interior of said mandrel.

5. A circular loom including in its construction, a mandrel and instrumentalities for interweaving warp threads with a helical weft thread about the mandrel, said mandrel being hollow and having a discharge orifice, and means for conducting a plastic composition to said mandrel under such pressure as to cause ejection of the composition from said orifice.

6. An apparatus for producing internally coated woven tubes comprising a circular series of heddles arranged and operated to form and constantly change a circular shed, a shuttle mounted to travel about the center of such shed, an annular guide for locating the weaving point or line of the shed, and a nozzle projecting across such weaving point into such guide toward the direction in which the completed tube is led away, said nozzle having a lateral discharge orifice and an annular gage at the side of said orifice toward which the tube is so led.

7. In a circular loom, a combined mandrel and nozzle having a lateral orifice adjacent to one end, and having an annular gage or scraper between such orifice and its extreme end, and means for supplying a plastic substance to the interior of said mandrel.

8. In a circular loom comprising a supported tubular mandrel, an annular guide surrounding one end of said mandrel, heddles arranged to form a circular shed surrounding the mandrel adjacent to said guide, a shuttle arranged and operable to lay a filling in said shed around the mandrel, a tank containing a plastic substance, and a conduit leading from said tank to the interior of said mandrel, the mandrel having one or more lateral discharging orifices adjacent to that end which is contained within the annular guide.

9. In combination, a circular loom adapted to weave a tubular fabric, a conduit connected with a supply source of fluid coating composition extending toward the plane of weaving, and a nozzle passing from said conduit across the weaving point at the center thereof, said nozzle having one or more discharge orifices at the other side of the weaving point from the conduit.

10. In combination, a circular boom adapted to weave a tubular fabric about an annular weaving point, a conduit extending toward said weaving point, and a nozzle passing from said conduit across the weaving point at the center thereof, said nozzle having one or more discharge orifices at the other side of the weaving point from the conduit, a tank containing a plastic composition communicating with said conduit, and means for applying pressure to said composition in said tank.

11. A machine for constructing and lining tubular fabrics, comprising in combination a collection of instrumentalities constructed, arranged, and operable to weave a tubular fabric at a given point, a nozzle crossing said weaving point and entering the newly constructed tube, and means for cooling the tube externally at a point adjacent to the discharge orifice of the nozzle.

12. A machine for constructing and lining woven tubes comprising instrumentalities constructed, arranged, and operated to weave warp and filling elements into a tubular fabric, a nozzle entering the newly constructed tube arranged to discharge a plastic lining composition against the inner surface thereof, and a guide having an annular recess for reception of a cooling agent surrounding the tubular fabric adjacent to the discharge point of said nozzle.

13. A means for applying lining to a tube comprising a nozzle having an external encircling groove with one or more orifices connecting said groove with the interior conducting channel of the nozzle, the lip at one side of the groove serving as a gage to determine the thickness of the lining deposited by the nozzle, and means for forcing a plastic composition under a predetermined pressure into said nozzle.

14. A nozzle for the purpose described having an internal conducting passage and an external encircling delivery space, with one or more communicating passages, one of the bounding walls of said delivery space being flared outwardly toward the extremity of the nozzle, whereby to apply pressure upon the material delivered from the nozzle into a tube in which the nozzle is inserted.

15. The method of making lined or internally coated woven tubes which consists in weaving a tubular fabric and at the same time feeding a plastic composition into the interior of the fabric and in contact with the inner walls but out of contact with the outer surface of the fabric near the weaving point.

16. The method of producing a lined woven tube which consists in continuously weaving an open tubular fabric, continuously injecting into the end thereof adjacent to the point at which the weaving takes place, a composition which is fluid at high temperatures and becomes set at cooling, and cooling the tube adjacent to the point of delivery of such composition.

17. A method of making lined woven tubes which consists in continuously weaving a tubular fabric, conducting a plastic lining substance into the interior of said fabric from the end thereof at which the weaving operation takes place, and discharging said composition laterally against the inner surface of the fabric, and causing the plastic composition to become firm.

In testimony whereof I have affixed my signature.

JOSEPH A. KENNEDY.